United States Patent Office 3,694,352
Patented Sept. 26, 1972

3,694,352
SLURRY HYDROREFINING OF BLACK OILS WITH MIXED VANADIUM AND MANGANESE SULFIDES
William T. Gleim, Island Lake, Ill., assignor to Universal Oil Products Company, Des Plaines, Ill.
No Drawing. Filed Feb. 24, 1970, Ser. No. 13,837
Int. Cl. C10g 23/02
U.S. Cl. 208—215                      3 Claims

ABSTRACT OF THE DISCLOSURE

A catalytic slurry process for hydrorefining a hydrocarbonaceous charge stock containing hydrocarbon-insoluble asphaltenes. The process is effected in slurry fashion with the charge stock being admixed with vanadium and manganese components. The slurry is reacted at conditions including a temperature above about 225° C. and a pressure greater than about 500 p.s.i.g., and in the presence of hydrogen containing from 1.0 mol percent to about 20.0 mol percent hydrogen sulfide. A preferred technique involves dissolving organic complexes of vanadium and manganese in the charge stock, whereby the catalytic vanadium and manganese sulfides are produced in situ at the foregoing operating conditions.

APPLICABILITY OF INVENTION

The invention described herein is adaptable to a process for effecting the conversion of asphaltene-containing petroleum fractions into lower-boiling hydrocarbon products. More specifically, the present invention is directed toward a slurry-type catalytic process for continuously converting hydrocarbonaceous material such as atmospheric tower bottoms, vacuum tower bottoms (vacuum residuum), crude oil residuals, topped crude oils, coal oil extracts, crude oils derived from tar sands, etc., all of which are generally referred to in the art as "black oils." In particular, the process described herein affords a substantial degree of asphaltene conversion into hydrocarbon-soluble products, while simultaneously effecting a significant degree of hydrorefining in order to reduce the concentration of sulfurous and nitrogenous compounds.

Hydrocarbonaceous black oils contain high molecular weight, sulfurous compounds in exceedingly large quantities. Black oils also contain excessive amounts of nitrogenous compounds, high molecular weight, organometallic complexes, principally comprising nickel and vanadium, and asphaltenic material. The latter is generally found to be complexed or linked with sulfur and, to a certain extent, with the organo-metallic contaminants. An abundant supply of such hydrocarbonaceous material exists, most of which has a gravity less than 20.0° API, and which is further characterized by a boiling range indicating that 10.0% by volume, and generally more, boils above a temperature of about 1050° F.

The process of the present invention is particularly directed toward the catalytic conversion of black oils into distillable hydrocarbons. Specific examples of black oils, illustrative of those to which my invention is especially applicable, include a full boiling range Wyoming sour crude oil having a gravity of about 23.2° API, and containing about 2.8% by weight of sulfur, approximately 2,700 p.p.m. of total nitrogen, a total of about 100 p.p.m. of metallic contaminants (computed as elemental nickel and vanadium) and an insoluble asphaltenic fraction in an amount of about 8.4% by weight; a crude tower bottoms product, having a gravity of 14.3° API, and containing about 3.0% by weight of sulfur, 3,800 p.p.m. of total nitrogen, about 85 p.p.m. of total metals and about 10.9% by weight of asphaltenic materials; and, a vacuum tower bottoms product having a gravity of 7.0° API, containing more than 6,000 p.p.m. of nitrogen, about 4.0% by weight of sulfur, more than 450 p.p.m. of metallic contaminants and about 24.0% by weight of pentane-insoluble asphaltenic material.

With respect to black oil charge stocks, the principal difficulty heretofore encountered is the lack of sufficient catalyst stability, especially in fixed-bed catalyst system, in the presence of the asphaltenic compounds and the excessive concentrations of sulfur. The asphaltenic fraction consists primarily of high molecular weight, non-distillable coke precursors, insoluble in light hydrocarbons such as propane, pentane or heptane. In addition to the asphaltenes, sulfurous and nitrogenous compounds, hydrocarbonaceous black oils contain large quantities of metallic contaminants generally in the range of about 50 p.p.m. to as high as 1,000 p.p.m. by weight, as the elemental metals. A reduction in the concentration of the organo-metallic contaminants, such as metal porphyrins, is not easily achieved, and to the extent that the same no longer exert detrimental effects with respect to further processing.

The primary purpose of the present invention is to provide an efficient and economical process for the conversion or hydrorefining of heavy hydrocarbonaceous material containing insoluble asphaltenes, utilizing a solid, finely-divided catalytic component in slurry admixture with the fresh feed charge stock. The term "hydrorefining," as employed herein, connotes the catalytic treatment, in an atmosphere of hydrogen, of a hydrocarbon fraction or distillate for the purpose of eliminating and or reducing the concentration of the various contaminating influences previously described. There is afforded a greater yield of lower-boiling liquid hydrocarbon products which are suitable for further processing without experiencing the difficulties otherwise resulting from the presence of the foregoing contaminating influences. The catalytic component, utilized in the slurry process of the present invention, is a mixture of non-stoichiometric vanadium sulfide and manganese sulfide.

OBJECTS AND EMBODIMENTS

As hereinbefore set forth, a principal object of the present invention is to provide a process for the conversion of petroleum black oils. A corollary object is to convert hydrocarbon-insoluble asphaltenes into hydrocarbon soluble, lower-boiling normally liquid products.

Another object is to effect removal of sulfurous and nitrogeneous compounds through the destructive conversion thereof to hydrocarbons, hydrogen sulfide and ammonia.

A specific object of my invention is to effect the continuous decontamination of asphaltenic black oils by providing a slurry process utilizing a finely-divided solid catalytic component.

Therefore, in one embodiment, my invention encompasses a process for hydrorefining an asphaltene-containing hydrocarbon charge stock which comprises reacting said charge stock and hydrogen, containing from 1.0 mol percent to about 20.0 mol percent hydrogen sulfide, at hydrorefining conditions and in contact with a catalytic amount of mixed vanadium and manganese sulfides.

Other embodiments of my invention reside in the utilization of particular operating conditions and techniques, concentration of reactants, etc. For example, the hydrorefining conditions include a temperature in the range of 225° C. to about 500° C. and a pressure from 500 p.s.i.g. to about 5,000 p.s.i.g. Furthermore, with respect to the mixture of vanadium and manganese sulfides, the atomic ratio of vanadium to manganese is preferably in the range of about 1.0 to about 10.0. These, as well as other ob-

SUMMARY OF INVENTION

The catalytic composite, utilized in the slurry process of my invention is finely-divided and comprises a mixture of manganese sulfide and a non-stoichiometric vanadium sulfide. These catalytic components may be composited with a finely-divided porous carrier material including alumina, silica, zirconia, titania, alumina-silica, alumina-zirconia, alumina-silica-boronphosphate, etc. A preferred processing technique employs the catalytic components as unsupported sulfides. Whether supported, or unsupported, the finely-divided catalytic components having a nominal diameter of about 0.05 mm. to about 3.0 mm. The use of the term "unsupported" is intended to designate a catalyst or catalytic component, which is not an integral part of a composite with a porous carrier material. That is, the catalytic mixture of managanese sulfide and vanadium sulfide is preferably utilized without the addition thereto of extraneous material. With respect to the vanadium sulfide, it is non-stoichiometric, and the precise atomic ratio of sulfur to vanadium is not known with accuracy. Analyses have indicated, however, that the catalytic vanadium sulfide has a ratio of sulfur to vanadium not less than 0.8:1, not greater than 1.8:1. This is not intended to mean that the vanadium sulfide has but a single specific sulfur/vanadium atomic ratio but rather refers to a mixture of vanadium sulfides having sulfur/vanadium atomic ratios in the aforesaid range.

When the use of a porous carrier material is desried, for example, 68.0% by weight of alumina, 22.0% by weight of boron phosphate, and 10.0% by weight of silica, the supported catalyst is prepared by impregnating the finely-divided carrier with a mixture of vandyl and manganous sulfates dissolved in water in the desired proportions. When suspended, or dissolved in the charge stock, the catalytic component is prepared in the reaction zone in situ by initially dissolving organic complexes of vanadium and manganese in the fresh feed charge stock. At the reaction conditions employed, the solution is decomposed in the hydrogen/hydrogen sulfide atmosphere to form the finely-dispersed mixture of vanadium and manganese sulfides. Whether supported or unsupported, the atomic ratio of vanadium to manganese is preferably in the range of 1.0 to 10.0, and the concentration of vanadium is from 1.0% to about 20.0% by weight. With respect to suitable complexing agents for the vanadium and manganese, the important criteria are that the complex be stable in air and oil soluble. Therefore, vanadium and manganese, in different oxidation states, can be complexed with the following: primary, secondary, and tertiary aliphatic amines; aromatic amines; alcohol, phenols, and the corresponding thio compounds; ether, aldehydes, ketones, di-ketones, quinones and the corresponding thio compounds; amino alcohol and acids; cyanides; and, substituted phosphines and phosphenic oxides, etc.

The charge stock, containing the complexes of vanadium and manganese, is commingled with hydrogen in an amount of from 5,000 to about 10,000 s.c.f./bbl., which hydrogen contains from 1.0% to about 20.0% hydrogen sulfide. Following suitable heat-exchange with various hot effluent streams, the temperature of the mixture is further increased to the level desired at the inlet to the reaction zone. Since the reactions being effected are principally exothermic, the temperature of the effluent from the reaction chamber will be higher than the inlet temperature thereto. The inlet temperature is generally controlled at a minimum level of about 225° C., and at higher levels such that the outlet temperature does not exceed about 500° C. Experience indicates that excellent results are generally attainable when the temper- The reaction zone is maintained under an imposed pressure gradient across the reaction chamber is about 380° sure greater than about 500 p.s.i.g. and preferably at a level from 1500 to about 5,000 p.s.i.g.

Although the present process may be effected in an elongated reaction zone with the mixture being introduced thereto in the upper portion thereof, the effluent being removed from a lower portion, an upflow system offers numerous advantages. The principal advantage resides in the fact that the extremely heavy portion of the charge stock has an appreciably longer residence time within the reaction zone, with the result that a greater degree of conversion is attainable, and incoming hydrogen will effectively strip lower-boiling products therefrom. Also, the heavy unconverted asphaltenic material can be withdrawn from the bottom of the reaction chamber along with the finely-divided catalytic particles. The internals of the reaction chamber, or vessel, may be constructed in any suitable manner capable of providing the required intimate contact between the charge stock, the gaseous mixture and the catalyst. In some instances, it may be desirable to facilitate distribution by means of perforated trays or other special mechanical devices. The liquid product effluent containing distillable hydrocarbons, along with hydrogen, hydrogen sulfide, ammonia, and normally gaseous hydrocarbons, principally methane, ethane, and propane, are removed from the upper portion of the reaction chamber. A hot flash system, functioning at essentially the same pressure as the reaction chamber in a first stage, and at a substantially reduced pressure in a subsequent stage serves to separate the overhead product effluent into a principally vaporous phase, the principal portion of which boils below about 800° F., and a principally liquid phase boiling above about 800° F. The latter may be recycled to combine with the fresh charge stock, thereby serving as a diluent, or it may be conveniently employed to facilitate the introduction of the catalytic component to the reaction zone.

The principally vaporous phase passes into a cold, high pressure separator (about 60° F. to about 140° F.), wherein a hydrogen-rich gaseous phase is recovered and recycled, along with make-up hydrogen required to supplant that consumed within the reaction chamber. The normally liquid phase from the cold separator, containing some butanes, is generally subjected to fractionation to prepare a charge stock suitable for further processing. The hot flash system may also function to remove all distillable hydrocarbons boiling below any other desired temperatures such as 750° F., 950° F., 1050° F., etc.

With respect to the unconverted asphaltene-containing stream from the bottom portion of the reaction zone, it may be totally recycled to combine with the fresh hydrocarbonaceous charge stock. Likewise, entrained catalyst and unconverted asphaltenes, removed from the hot flash system, may be recycled to combine with the fresh hydrocarbonaceous charge stock. However, it is a preferred technique to withdraw a drag stream which contains at least about 10.0% by weight of the catalytic vanadium and manganese sulfides. Any suitable means may be utilized to separate the solid catalyst and unreacted asphaltenic material from the liquid-phase hydrocarbons, including filtration, settling tanks, a series of centrifuges, etc. A like quantity of the catalytic component is then added in order to maintain the desired catalyst content of the slurry. The material withdrawn from the drag stream is separated, for example, by a series of filtration and methyl naphthalene washing techniques. Methyl naphthalene is employed to remove residual, soluble hydrocarbons from the catalyst-containing sludge. The remainder of the catalyst sludge may then be burned in air to produce the oxides of vanadium and manganese which may then be converted to the oil-soluble complexes. For example, the mixed vanadium and manganese oxides are suspended in sulfuric acid and treated with sulfur dioxide to form vanadyl sulfate and manganese sulfate. These are then converted to the acetyl acetonates by well known procedures.

DESCRIPTION OF A PREFERRED EMBODIMENT

The fresh feed charge stock in this illustrative embodiment is a vacuum tower bottoms product obtained from the sour Wyoming crude oil hereinbefore described. The crude oil has a gravity of about 7.4° API, and contains only about 10.48% by weight of heptane-insoluble asphaltenes, 3.57% by weight of sulfur, 5890 p.p.m. by weight of nitrogen and total metals in an amount of about 240 p.p.m.

Vanadyl acetyl acetonate and manganous acetyl acetonate are dissolved in methyl naphthalene, the solution being admixed with the vacuum tower bottoms in an amount such that the concentration of vanadium therein is about 5.0%. The atomic ratio of vanadium to manganese is about 2.0. The reaction zone is pressured to a level of about 3,000 p.s.i.g., utilizing compressive hydrogen recycle in an amount of about 20,000 scf./bbl.; the hydrogen recycle stream contains about 15.0 mol percent hydrogen sulfide. The charge stock mixture is circulated through a block heater at a temperature of about 225° C. for a period of about 1 hour. The temperature of the block heater is increased to a level such that the temperature gradient, as measured from the reaction zone inlet to the outlet, is controlled at about 350° C. to about 420° C. The fresh feed charge rate is about 100 milliliters per hour, and make-up hydrogen is added in amount of about 12.5 s.c.f./hr.

After a line-out period, analyses of the normally liquid product effluent, from about an 8-hour test period, indicates greater than about 96.5% asphaltene conversion, less than about 15.0 p.p.m. of organo-metallic complexes and a gravity of about 15.5° API. Furthermore, approximately 50% of the sulfurous and nitrogenous compounds are converted into hydrocarbons, hydrogen sulfide and ammonia.

I claim as my invention:

1. A process for hydrorefining an asphaltene-containing hydrocarbon charge stock which comprises reacting said charge stock and hydrogen, containing from 1.0 mol percent to about 20.0 mol percent hydrogen sulfide, at hydrorefining conditions and in contact with a catalytic amount of unsupported mixed vanadium and manganese sulfides, said mixed sulfides being formed in situ by admixing hydrocarbon-soluble complexes of vanadium and manganese with said charge stock, and said sulfides being further characterized in that the vanadium sulfide thereof is non-stoichiometric having a sulfur to vanadium atomic ratio of from 0.8:1 to about 1.8:1.

2. The process of claim 1 further characterized in that the concentration of vanadium sulfide is 1.0% to about 20.0% by weight of the reaction mixture, calculated as the elemental metal, and the atomic ratio of vanadium to manganese is in the range of 1.0 to 10.0.

3. The process of claim 1 further characterized in that said hydrorefining conditions include a temperature in the range of 225° C. to about 500° C. and a pressure from 500 p.s.i.g. to about 5,000 p.s.i.g.

References Cited

UNITED STATES PATENTS

| | | | |
|---|---|---|---|
| 3,558,474 | 1/1971 | Gleim et al. | 208—213 |
| 3,052,622 | 9/1962 | Johnson et al. | 208—213 |
| 2,771,401 | 11/1956 | Shepherd | 208—215 |

FOREIGN PATENTS

| | | | |
|---|---|---|---|
| 938,819 | 10/1963 | Great Britain | 208—251 R |

DELBERT E. GANTZ, Primary Examiner

G. J. CRASANAKIS, Assistant Examiner